United States Patent
Okamoto

(10) Patent No.: US 6,580,063 B1
(45) Date of Patent: Jun. 17, 2003

(54) SOLID STATE IMAGING DEVICE HAVING HIGH OUTPUT SIGNAL PAIN

(75) Inventor: Fuyuki Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/523,343

(22) Filed: Mar. 10, 2000

(30) Foreign Application Priority Data

Mar. 11, 1999 (JP) ............................................. 11-064679

(51) Int. Cl.[7] ............................................. H01L 27/00
(52) U.S. Cl. .............................. 250/208.1; 250/214 A; 348/294
(58) Field of Search .......................... 250/208.1, 214 A; 257/291, 444; 348/308, 294, 300–301, 305; 330/10

(56) References Cited

U.S. PATENT DOCUMENTS

| 5,252,868 A |   | 10/1993 | Miida et al. |
|---|---|---|---|
| 5,990,471 A | * | 11/1999 | Watanabe ................. 250/208.1 |
| 6,084,229 A | * | 7/2000 | Pace et al. ................. 250/208.1 |
| 6,130,423 A | * | 10/2000 | Brehmer et al. ......... 250/208.1 |

FOREIGN PATENT DOCUMENTS

| EP | 0 240 682 A2 | 10/1987 |
|---|---|---|
| EP | 0 276 020 A2 | 7/1988 |
| JP | 5-252445 | 9/1993 |
| WO | 96/03626 A1 | 7/1995 |

* cited by examiner

*Primary Examiner*—Kevin Pyo
*Assistant Examiner*—Seung C Sohn
(74) *Attorney, Agent, or Firm*—Choate, Hall & Stewart

(57) ABSTRACT

The solid state imaging device comprising active pixels has a structure in which transistors for amplification 103 and 113 which amplify an output signal of a photodiode 101 composing a photoelectric conversion portion are constituted as a voltage follower. By using the transistors for amplification 103 and 113 having a voltage follower structure, a gain of amplifying a signal from each pixel is made unity, and an amplification gain can be larger than that of an amplification circuit having a conventional source follower structure. Thereby, noise immunity is improved. Also, by inserting switching transistors corresponding to row selecting transistors, circuit symmetry of a differential amplifier circuit can be improved.

18 Claims, 8 Drawing Sheets

PRIOR ART

SOLID STATE IMAGING DEVICE HAVING HIGH OUTPUT SIGNAL PAIN

FIELD OF THE INVENTION

The present invention relates generally to a solid state imaging device or a solid state image pickup device, and more particularly to a solid state imaging device which uses so-called active pixels and in which an electrical signal after photoelectric conversion can be outputted almost without attenuation.

BACKGROUND OF THE INVENTION

In an active pixel in which an electrical signal after photoelectric conversion is amplified by a transistor disposed in each of the pixels, MOSFET's are generally used as the amplification means and switches. A plurality of pixels each composed of such an active pixel are disposed in a matrix, and a solid state imaging device is constituted thereof.

FIG. 8 is a circuit diagram showing a structure of a conventional solid state imaging device which comprises the above-mentioned active cells. In FIG. 8, an example of a circuit structure in which 2×2 pixels are disposed in a matrix is shown for the sake of simplicity.

Each pixel which constitutes an active pixel comprises a photodiode 801, a reset FET 802, an FET for amplification or an amplification FET 803, a row selection FET 804. An output portion or node of the photodiode 801 is reset by the reset FET 802. Also, the output portion of the photodiode 801 is coupled to the gate of the FET for amplification 803. The source of the FET for amplification 803 is connected to each of column signal line 808 via the row selection FET 804, and the drain of the FET for amplification 803 is connected to a power supply line 807.

For each column, there are provided a current source FET 809, and a column selecting FET 812. Each of the column signal line 808 is coupled to the ground via the current source FET 809. A bias line 815 biases the gate voltage of the current source FET 809 to an appropriate value such that the current source FET 809 performs a constant current operation. Each of the column signal lines 808 is connected to a signal line 813 via a column selecting FET 812. The signal line 813 is coupled to an input of an output buffer 814 from which an output signal of the solid state imaging device is outputted. There is also provided a row scanning circuit 810 which accesses each row, by turning on and off the row selection FET 804, and by turning on and off the reset switches 802 every row. Also, a column scanning circuit 811 is provided which accesses each column, by sequentially turning on and off the column selecting FET's 811.

In operation, the reset line 806 of a particular row is raised to a high potential level by the row scanning circuit 810. Thereby, the particular row is accessed, and the reset FET's 802 of all pixels in that row are turned on. Therefore, electric charges are injected into an output portion or node of each of the photodiodes 801 from a power supply line 807, and the potential of the output portion of each of the photodiodes 801 as photoelectric conversion means becomes approximately equal to a power supply voltage. Subsequently, the reset FET's 802 are turned off and an exposure time period begins to start. Thereafter, a current corresponding to an intensity of light irradiated onto each pixel flows through a photodiode 801 of a corresponding pixel, and electric charges existing at the output portion of each of the photodiodes 801 are gradually extracted to the ground.

After a predetermined time period has elapsed, a row selection line 805 is raised to a high potential level by the row scanning circuit 810, and the row selection FET's 804 in respective pixels are turned on simultaneously. Thereby, output voltages of the photodiodes 801 appear at respective column signal lines 808. That is, in each of the pixels, the FET for amplification or the amplification FET 803 and the current source FET 809 constitute a source follower circuit, and therefore a voltage near a gate voltage of the FET for amplification 803, that is, the output voltage of the photodiode 801, appears at the column signal line 808. Here, the bias line 815 supplies a bias voltage of appropriate potential to the gate of each of the current source FET's 809 such that the current source FET's 809 perform constant current operation. In this way, signals of a particular row are outputted and, subsequently, the column selection FET's 812 are sequentially turned on by the column scanning circuit 811, thereby the signals are readout via the signal line 813 and the output buffer 814.

The above-mentioned conventional active pixel type solid state imaging device has the following disadvantages. First, a gain of each source follower circuit becomes a value much lower than the ideal value of 100 percent, for example, a typical value of about 75 percent of the ideal value, due to the body effect or backgate effect. Thereby, a signal voltage at the output portion of each photodiode 801 and a signal voltage on the column signal line 808 are not equal to each other, and it is only possible to output an attenuated signal having a small amplitude. In other words, if the output signal of the photodiode ranges from 0 to 3 V, it is only possible to obtain a small signal typically ranging from 0 through 2.3 V on the column signal line 808. Therefore, the conventional solid state imaging device has a disadvantage that it is vulnerable to external noises.

Also, the conventional active pixel type solid state imaging device has a disadvantage that it is not suitable for use with a low power supply voltage. The reason for this is as follows. In general, a full-scale range of an output signal of a photodiode varies depending on a power supply voltage. That is, if the power supply voltage is high, the full-scale range becomes large, and if the power supply voltage is low, the full-scale range becomes small. This is because, the reset voltage of a photodiode is approximately equal to the power supply voltage, and an output voltage of the photodiode after exposure is equal to or smaller than the reset voltage. Therefore, in case of a conventional solid state imaging device having a source follower configuration, an amplitude of an output signal is small and the amplitude of the output signal becomes smaller as the power supply voltage becomes lower. Thus, usable voltage range of a power supply voltage in which the solid state imaging device is operable as a device is limited.

Further, in general, an AD converter is coupled to a rear stage of a solid state imaging device. However, since the amplitude of an output signal of a conventional solid state imaging device is small, the AD converter must have a high resolution, so that a high performance AD converter is required. Therefore, an overall cost of an imaging apparatus or system becomes disadvantageously high.

SUMMARY OF THE INVENTION

It is an object of the present invention to provide an active pixel type solid state imaging device in which a signal after photoelectric conversion can be outputted at approximately a unity gain and deterioration of an amplitude of the signal can be suppressed.

It is another object of the present invention to provide an active pixel type solid state imaging device which is robust against noises.

It is still another object of the present invention to provide an active pixel type solid state imaging device which is suitable for use with a low power supply voltage.

It is still another object of the present invention to provide an active pixel type solid state imaging device in which an increase in the total cost of an imaging system can be suppressed.

According to an aspect of the present invention, there is provided a solid state imaging device comprising: a plurality of active pixels each of which has at least a photodiode and a first amplification transistor for amplifying an output of said photodiode and which are disposed in a matrix having rows and columns; a plurality of row selecting lines disposed corresponding to rows of said plurality of active pixels respectively; a plurality pair of column signal lines disposed corresponding to columns of the plurality of active pixels respectively; and second amplification transistors which are disposed corresponding to the respective pairs of column signal lines and which amplify outputs of the active pixels delivered via the pairs of column signal lines; wherein, in response to a row selecting signal for selecting active pixels of one row, the first amplification transistors of the active pixels of the selected row and the second amplification transistors disposed in corresponding columns are coupled to form voltage followers, and output signals of the active pixels of the selected row are amplified by the voltage followers.

In this case, it is preferable that each of the voltage followers includes the first amplification transistor, the second amplification transistor, and a current mirror circuit comprising a pair of transistors constituting a reference side load and an output side load.

It is also preferable that the gate of the first amplification transistor is coupled to an output of the photodiode, the source of the first amplification transistor is coupled to the source of the second amplification transistor via one of the pair of column signal line, and the drain of the first amplification transistor is coupled to the reference side load of the current mirror circuit via the other of the pair of column signal line, and wherein the gate of the second amplification transistor is coupled to the drain thereof, and the drain of the second amplification transistor is coupled to the output side load of the current mirror circuit.

It is further preferable that the source of the first amplification transistor is coupled to one of the pair of column signal lines via a first switching transistor, and the gate of the first switching transistor is coupled to the row selecting line.

It is advantageous that the drain of the first amplification transistor is coupled to the other of the pair of column signal lines via a second switching transistor, and the gate of the second switching transistor is coupled to the row selecting line.

It is also advantageous that the source and the drain of the first amplification transistor are coupled to the pair of column signal lines via first and second switching transistors respectively, and the gates of the first and second switching transistors are coupled to the row selecting line.

It is further advantageous that the source of the second amplification transistor is coupled to the one of the pair of column signal lines via a third switching transistor.

It is preferable that the drain of the second amplification transistor is coupled to the output side load of the current mirror circuit via a fourth switching transistor.

It is also preferable that the source and the drain of the second amplification transistor are coupled to the one of the pair of column signal lines via a third switching transistor and to the output side load of the current mirror circuit via a fourth switching transistor.

It is further preferable that the solid state imaging further comprises column selecting transistors for selectively coupling an output signal of the active pixel of a selected column to an output signal line via the voltage follower.

It is advantageous that each of the active pixels further comprises a reset transistor for resetting an output voltage of the photodiode before an exposure period.

According to another aspect of the present invention, there is provided a solid state imaging device comprising: a plurality of active pixels each of which has at least a photodiode, a reset transistor for resetting an output voltage of the photodiode, and a first amplification transistor for amplifying an output of the photodiode and which are disposed in a matrix having rows and columns; a row scanning circuit for selecting a row of the active pixels disposed in a matrix; a column scanning circuit for selecting a column of the active pixels disposed in a matrix; a plurality of row selecting lines which are respectively disposed along the rows of the active pixels and which couple from the row scanning circuit to the active pixels of respective rows; a plurality pair of column signal lines which are respectively disposed along the columns of the active pixels; a plurality of reset lines which are respectively disposed along the rows of the active pixels and which couple from the row scanning circuit to the reset transistors in the active pixels of respective rows to provide the reset transistors with a reset signal to start an exposure period of the active pixels; second amplification transistors which are disposed corresponding to the respective pairs of column signal lines and which amplify outputs of the active pixels delivered via the pairs of column signal lines; wherein, in response to a row selecting signal for selecting active pixels of one row, the first amplification transistors of the active pixels of the selected row and the second amplification transistors disposed in corresponding columns are coupled to form voltage followers, and output signals of the active pixels of the selected row are amplified by the voltage followers.

In this case, it is preferable that each of the voltage followers includes the first amplification transistor, the second amplification transistor, and a current mirror circuit comprising a pair of transistors constituting a reference side load and an output side load.

It is also preferable that the gate of the first amplification transistor is coupled to an output of the photodiode, the source of the first amplification transistor is coupled to the source of the second amplification transistor via one of the pair of column signal line, and the drain of the first amplification transistor is coupled to the reference side load of the current mirror circuit via the other of the pair of column signal line, and wherein the gate of the second amplification transistor is coupled to the drain thereof, and the drain of the second amplification transistor is coupled to the output side load of the current mirror circuit.

It is further preferable that the source and/or the drain of the first amplification transistor are coupled to the pair of column signal lines via first and/or second switching transistors respectively, and the gates of the first and/or second switching transistors are coupled to the row selecting line.

It is advantageous that the source and/or the drain of the second amplification transistor are coupled to one of the pair of column signal lines via a third switching transistor and/or to the output side load of the current mirror circuit via a fourth switching transistor.

In the solid state imaging device of the present invention, the first amplification transistors of the pixels and the second amplification transistors disposed in respective columns are coupled in a voltage follower structure in response to a row selecting signal. Therefore, the gain of amplification of an output signal of each active cell becomes larger than that of a conventional solid state imaging device. Thus, according to the present invention, it is possible to provide a solid state imaging device which is robust against noises, which is suitable for use with a low power supply voltage, and which has low cost as a whole.

Also, by the above-mentioned structure, it is possible to easily obtain the voltage follower structure. By coupling the above-mentioned first or second switching transistors to the source or the drain of the first amplification transistor respectively, a selection of an active pixel is performed by the row selecting line, and by coupling the first and second switching transistors to both, signal separation in a column direction becomes easy. Further, by using the abovementioned third and/or fourth switching transistors, symmetry of a differential amplifier constituting a voltage follower is improved.

BRIEF DESCRIPTION OF THE DRAWINGS

These and other features, and advantages, of the present invention will be more clearly understood from the following detailed description taken in conjunction with the accompanying drawings, in which like reference numerals designate identical or corresponding parts throughout the figures, and in which.

DESCRIPTION OF A PREFERRED EMBODIMENT

With reference to the drawings, the present invention will be described in further detail based on embodiments of the present invention.

Figure 1:
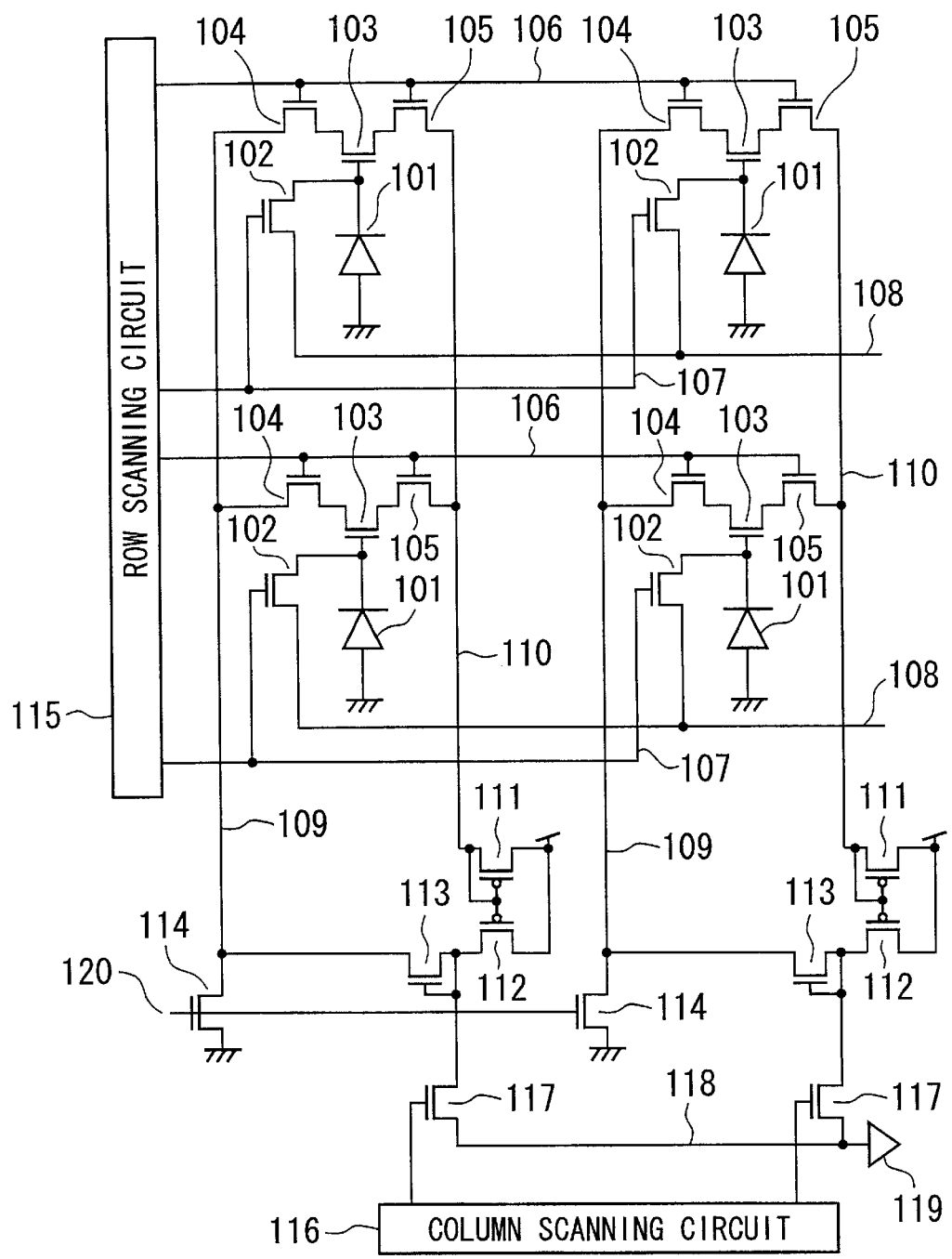
FIG. 1 is a schematic circuit diagram showing a structure of a solid state imaging device according to a first embodiment of the present invention.

FIG. 1 schematically shows a structure of a solid state imaging device according to a first embodiment of the present invention. In FIG. 1, a structure of the solid state imaging device of this embodiment is shown by using an example in which 2×2 pixels are disposed in a matrix, for the sake of simplicity. Also, with respect to each of FET's, active load FET's 111 and 112 are composed of p type MOSFET's, and the other FET's are composed of n type MOSFET's.

In FIG. 1, each pixel which constitutes an active pixel comprises a photodiode 101, a reset FET 102, a first FET for amplification or a first amplification FET 103, a source side switch FET 104 and a drain side switch FET 105. An output portion of the photodiode 101 is reset by the reset FET 102. Also, the output portion of the photodiode 101 is coupled to the gate of the first FET for amplification 103. The source of the first FET for amplification 103 is connected to the drain of the source side switch FET 104, and the drain of the first FET for amplification 103 is connected to the source of the drain side switch FET 105. The sources of the source side switch FET's 104 on the same column are connected to a first column signal line 109, and the drains of the drain side switch FET's 105 on the same column are connected to a second column signal line 110.

For each column, there are provided a current source FET 114, a second FET for amplification or a second amplification FET 113, a first active load FET 111, a second active load FET 112, and a column selecting FET 117. The source of the source side switch FET 104 in each pixel is connected via the first column signal line 109 to the current source FET 114 as an input thereto. Each of the first column signal line 109 is coupled to the ground via the current source FET 114. A bias line 120 biases the gate voltage of the current source FET 114 to an appropriate value such that the current source FET 114 performs a constant current operation. The source of the second FET for amplification 113 is connected via the first column signal line 109 to the source of the source side switch FET 104 in each pixel. The drain side switch FET 105 in each pixel is connected via the second column signal line 110 to the first active load FET 111. The drain of the second FET for amplification 113 is connected to the second active load FET 112.

In this embodiment, the first and second active load FET's 111 and 112 constitute a current mirror configuration. The first and second FET's for amplification 103 and 113, the current source FET 114, and the first and second active load FET's 111 and 112 constitute a differential amplifier. In the differential amplifier, an input of the first FET for amplification 103 is a positive (i.e., non-inverting) input and an input of the second FET for amplification 113 is a negative (i.e., inverting) input. Also, an output the differential amplifier (i.e., a drain voltage of the second FET for amplification 113) is fed back to the input of the second FET for amplification 113, thereby a voltage follower is constituted. Each of the outputs of the differential amplifiers is connected to a signal line 118 via a column selecting FET 117. The signal line 118 is coupled to an input of an output buffer 119 from which an output signal of the solid state imaging device is outputted.

The solid state imaging device shown in FIG. 1 further comprises a row scanning circuit 115 and a column scanning circuit 116. The row scanning circuit 115 accesses each row, by turning on and off the source side switch FET 104 and the drain side switch FET 105 in each pixel via a row selecting line 106, and by turning on and off the reset FET's 102 via a reset line 107 every row. Also, the column scanning circuit 116 accesses each column, by sequentially turning on and off the column selecting FET's 117.

Operation of the solid state imaging device according to the first embodiment will now be described. First, by the row scanning circuit 115, a particular row is accessed. That is, the reset line 107 of a particular row is rendered high potential level by the row scanning circuit 115, and thereby the reset FET's 102 of all the pixels within the one row are turned on. Thereby, electric charges are injected into an output portion of the photodiode 101 from a power supply line 108, and the output portion of the photodiode 101 composing a photoelectric conversion means in each pixel has a potential level approximately equal to that of a power supply voltage. Subsequently, the reset FET's 102 are turned off and the exposure period starts. Thereafter, since a current having a magnitude corresponding to an intensity of light irradiated onto the pixel flows through the photodiode 101, electric charges existing at the output portion of the photodiode 101 are gradually extracted to the ground.

After a predetermined time period has elapsed, a potential level of the row selecting line 106 is rendered high, and the source side switch FET's 104 and the drain side switch FET's 105 in respective pixels are simultaneously turned on. Thereby, an output voltage of each photodiode 101 appears at the drain of the second FET for amplification 113. This is because, as-mentioned above, the first and second FET's for amplification 103 and 113, the current source FET 114, and the first and second active load FET's 111 and 112 constitute a differential amplifier in which an input of the first FET for amplification 103 is a positive (i.e., non-inverting) input and an input of the second FET for amplification 113 is a negative (i.e., inverting) input. Also, an output (i.e., a drain voltage of the second FET for amplification 113 is fed back to the input of the second FET for amplification 113, thereby a voltage follower is constituted.

In general, an open loop gain of a differential amplifier is sufficiently large and, therefore, when a negative feedback is applied thereto, an input terminal and an output terminal thereof have substantially the same voltage. Actually, the gain of such differential amplifier becomes approximately 1 (one), and is generally larger than the gain of a source follower. Thus, an output signal of the differential amplifier has substantially the same value as the output voltage of the photodiode 101, that is, a voltage of the gate of the first FET for amplification 103 which is the positive input terminal of the differential amplifier. In this way, after a signal of a particular row is outputted, the column scanning circuit 116 sequentially turns the column selecting FET's 117 on, and signals are read out via the signal line 118 and the output buffer 119.

Next, with reference to FIG. 2, an explanation will be made on a solid state imaging device according to a second embodiment of the present invention. The structure of the solid state imaging device according to this embodiment differs from that of the solid state imaging device according to the first embodiment in that, in this embodiment, drain side switches (105 of FIG. 1) are not provided. That is, in this embodiment, the drain of each of first FET's for amplification or first amplification FET's 203 is directly coupled to a first active load FET 210 via a second column signal line 209.

In this embodiment, since the drain side switch FET's do not exist, the number of elements within each pixel can be small, and the area of each pixel can be decreased. Also, in this embodiment, the number of FET's coupled to a row selecting line 205 is small and thus the power required for driving each of the row selecting lines 205 can be small. In other words, in this embodiment, it is possible to drive each of the row selecting lines 205 at a higher speed, when compared with the solid state imaging device of FIG. 1. However, since the drain side switch FET's do not exist, there is a possibility that small noises are superposed on an output signal.

Figure 2:
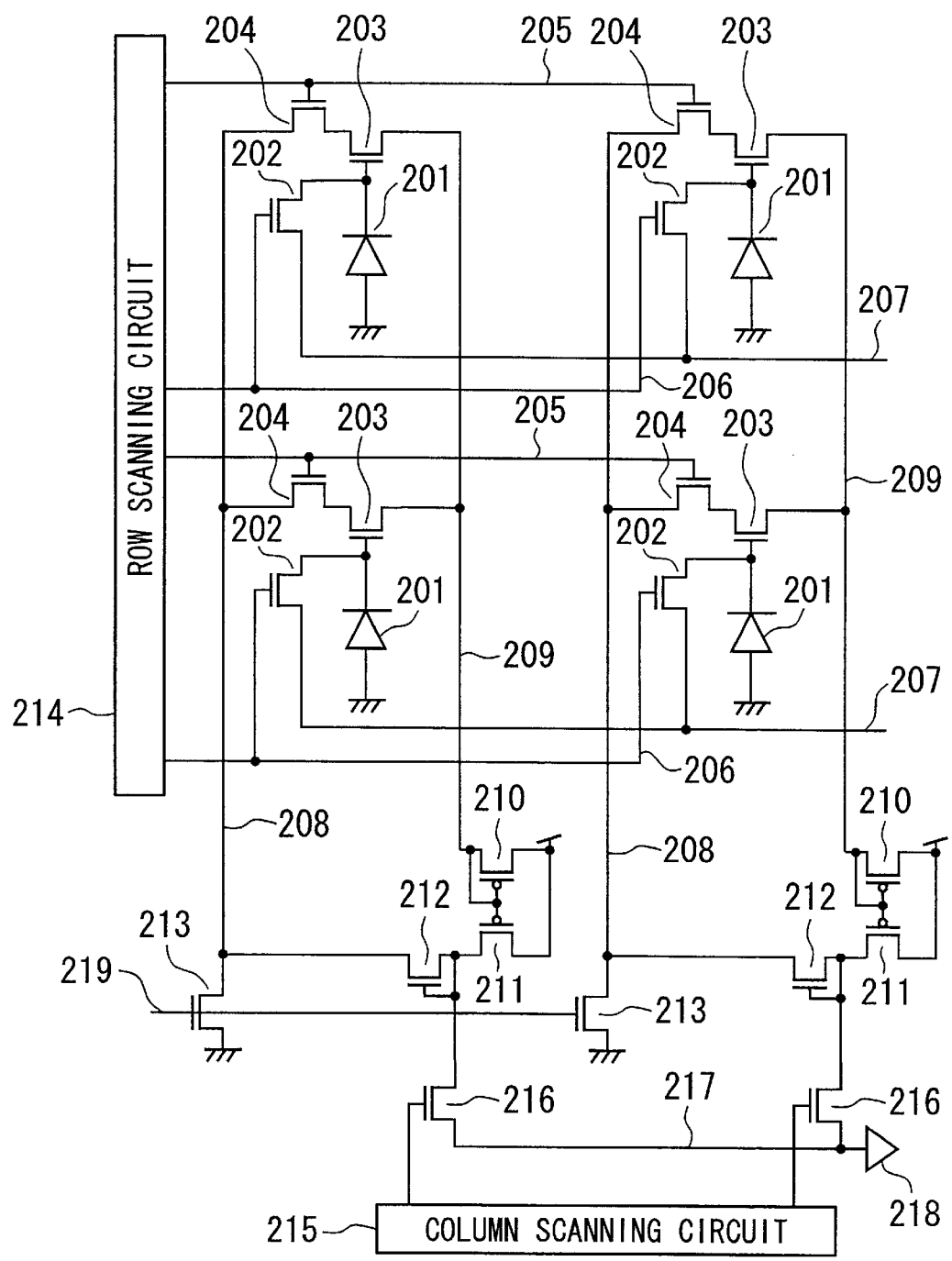
FIG. 2 is a schematic circuit diagram showing a structure of a solid state imaging device according to a second embodiment of the present invention.

For example, in FIG. 2, assume that the source side switch FET's 204 on the upper side row, that is, a first row, are turned on, but the source side switch FET's 204 on the lower side row, that is, a second row, are turned off. Basically, the first FET for amplification 203 on the upper side row, a second FET for amplification 212, a current source FET 213, first and second active load FET's 210 and 211 constitute a differential amplifier. The first FET for amplification 203 on the lower side row is disconnected from a first signal line 208, and normally does not conduct any current. However, when the potential of a photodiode in each pixel on the lower side row, that is, the gate potential of the first FET for amplification 203 on the lower side row, is not stable, there is a possibility that the second FET for amplification 203 on the lower side produces a small AC current which charges and discharges a parasitic capacitance in response to the variation of the potential. Such current appears on the second column signal line 209 as a noise current. Here, the parasitic capacitance is, for example, a capacitance caused by the gate-source overlap of the second FET for amplification 203, and the like.

Figure 3:
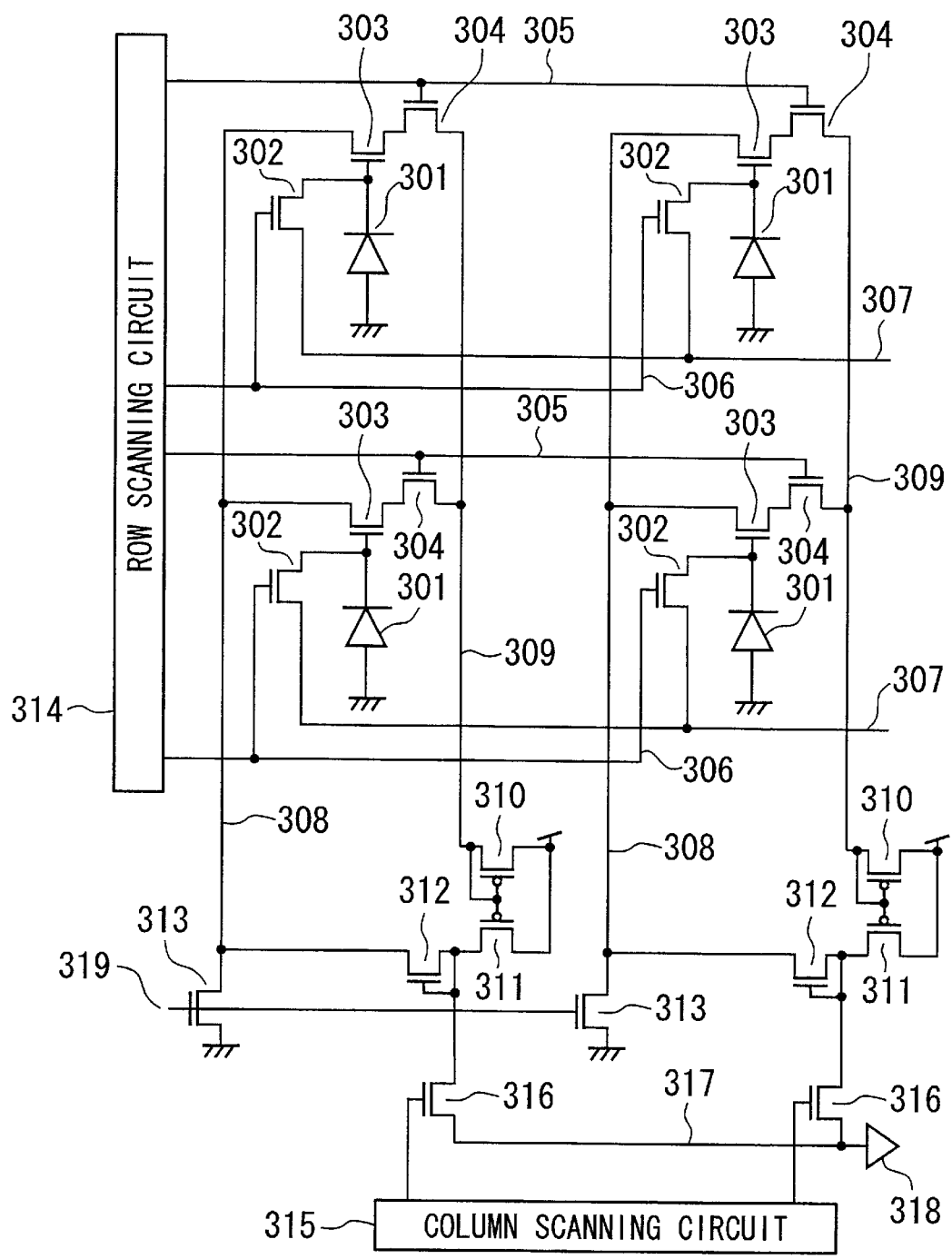
FIG. 3 is a schematic circuit diagram showing a structure of a solid state imaging device according to a third embodiment of the present invention.

With reference to FIG. 3, an explanation will be made on a solid state imaging device according to a third embodiment of the present invention. The structure of the solid state imaging device according to this embodiment differs from that of the solid state imaging device according to the first embodiment in that, in this embodiment, a source side switch is not provided in each pixel. That is, in this embodiment, the source of each of first FET's for amplification 303 is directly coupled to a current source FET 313 via a first column signal line 308. The solid state imaging device of this embodiment functions in a manner similar to that of the solid state imaging device of the second embodiment. In the structure of FIG. 3, the number of elements within each pixel can be smaller than that of the structure of FIG. 1, and the area of each pixel can also be decreased. Further, in this embodiment, since the load of a row scanning circuit is small, it is possible to drive each row selecting line at a higher speed. On the other hand, there is a possibility that small noises are superposed on an output signal, when compared with the structure of FIG. 1.

Figure 4:
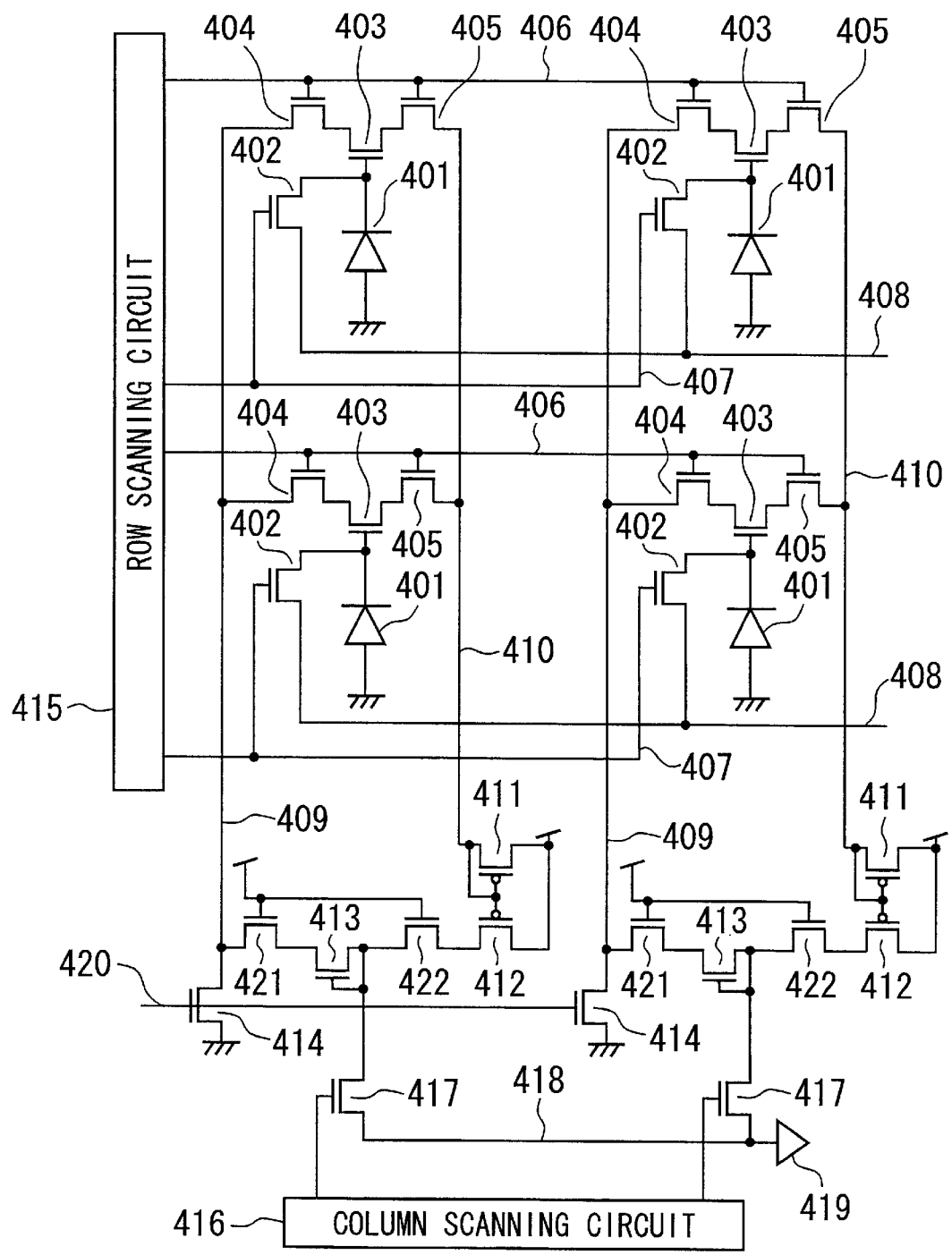
FIG. 4 is a schematic circuit diagram showing a structure of a solid state imaging device according to a fourth embodiment of the present invention.

With reference to FIG. 4, an explanation will be made on a solid state imaging device according to a fourth embodiment of the present invention. The structure of the solid state imaging device according to this embodiment differs from that of the solid state imaging device according to the first embodiment in that, in this embodiment, a second source side switch FET 421 and a second drain side switch FET 422 are respectively coupled to the source and the drain of a second FET for amplification 413 provided in each column. That is, the drain of the second source side switch FET 421 is coupled to the source of the second FET for amplification 413, and the source thereof is coupled to a current source FET 414. Also, the source of the second drain side switch FET 422 is coupled to the drain of the second FET for amplification 413, and the drain thereof is coupled to a second active load FET 412. These two FET's 421 and 422 newly inserted may be in normally turned on condition.

By inserting the above-mentioned two switch FET's, the following advantageous effect can be obtained. That is, in the first embodiment, the source side switch FET 104 and the drain side switch FET 105 are respectively coupled to the source and the drain of the first FET for amplification 103 within a pixel, while such switch FET's corresponding to these switch FET's are not coupled to the second FET for amplification 113. Therefore, although it is normally preferable that the first FET for amplification 103 and the second FET for amplification 113 should perform a completely symmetric operation, the differential amplifier in the first embodiment does not exactly perform a symmetric operation. For example, due to a voltage drop caused by the on-resistance of the source side switch FET 104, source potential of the first FET for amplification 103 and the second FET for amplification 113 are not exactly the same. Because of such incomplete symmetry, in the first embodiment, there is a possibility that an offset voltage appears on the output signal. This is caused by the same principle as that of causing an offset voltage in general when there is a difference between characteristics of two transistors constituting a differential pair in a differential amplifier. In this embodiment, the second source side switch FET 421 and the second drain side switch FET 422 are respectively coupled to the source and the drain of the second FET for amplification 413, and thereby the symmetry between the first FET for amplification 403 and the second FET for amplification 413 is improved. Thus, this embodiment has the merit in that generation of an offset voltage can be suppressed when compared with the first embodiment. However, the number of circuit elements in each column is increased when compared with the first embodiment.

Figure 5:
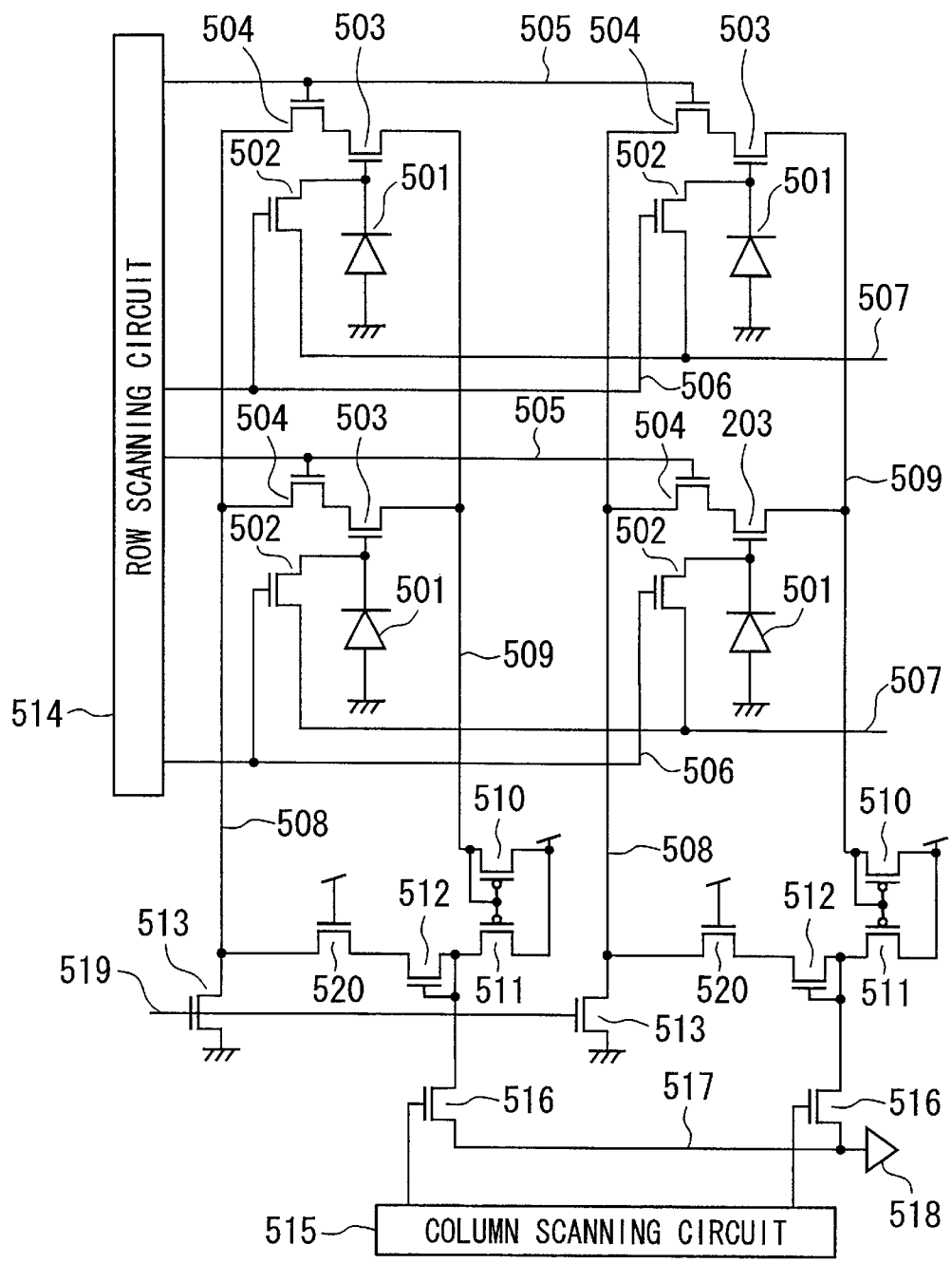
FIG. 5 is a schematic circuit diagram showing a structure of a solid state imaging device according to a fifth embodiment of the present invention.

With reference to FIG. 5, an explanation will be made on a solid state imaging device according to a fifth embodiment of the present invention. In this embodiment, a drain side switch FET is not disposed in each pixel, in a manner similar to the structure of the solid state imaging device according to the second embodiment. The structure of the solid state imaging device according to this embodiment differs from that of the solid state imaging device according to the first embodiment in that, in this embodiment, a second source side switch FET 520 is inserted into a source side circuit of a second FET for amplification 512 provided in each column. The source of the second source side switch FET 520 is coupled to a current source FET 513, and the drain thereof is coupled to the source of the second FET for amplification 512. In this way, by inserting the source side switch FET 520 and keeping it in a turned-on condition, the symmetry of the circuit is improved and generation of an offset voltage can be suppressed but the number of circuit elements in each column is increased, when compared with the second embodiment. These advantages and disadvantage are similar to those of the fourth embodiment.

Figure 6:
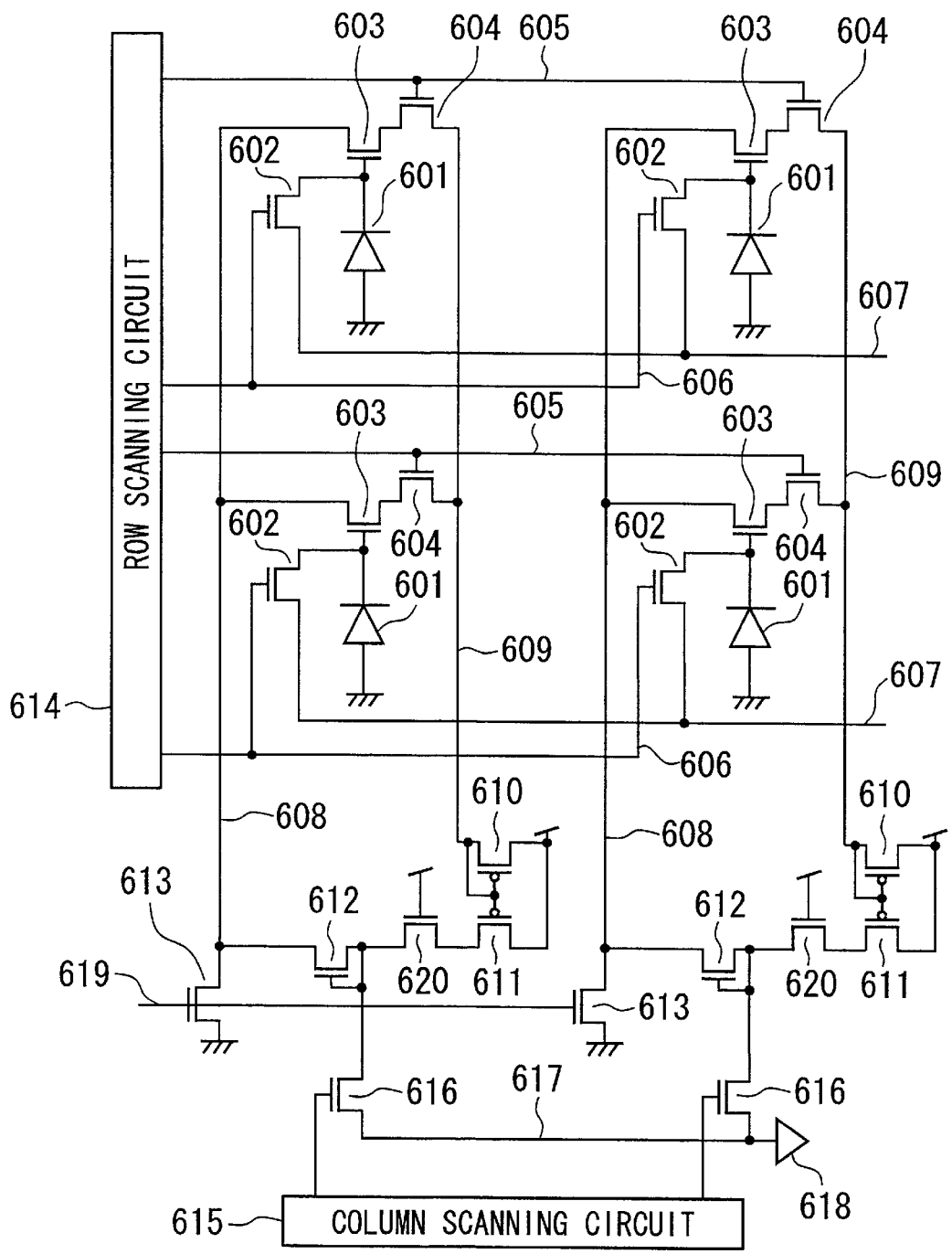
FIG. 6 is a schematic circuit diagram showing a structure of a solid state imaging device according to a sixth embodiment of the present invention.

With reference to FIG. 6, an explanation will be made on a solid state imaging device according to a sixth embodiment of the present invention. In this embodiment, a source side switch FET is not disposed in each pixel, in a manner similar to the structure of the solid state imaging device according to the third embodiment. The structure of the solid state imaging device according to this embodiment differs from that of the solid state imaging device according to the third embodiment in that, in this embodiment, a second drain side switch FET 620 is inserted into a drain side circuit of a second FET for amplification 612 provided in each column. The source of the second drain side switch FET 620 is coupled to the drain of the second FET for amplification 612, and the drain thereof is coupled to a second active load FET 611. In this way, by inserting the second source side switch and keeping it in a turned-on condition, the symmetry of the circuit is improved and generation of an offset voltage can be suppressed but the number of circuit elements in each column is increased, when compared with the third embodiment. These advantages and disadvantage are similar to those of the fourth embodiment.

It should be noted that the structure of each of the above-mentioned embodiments can also be applied to an imaging device in which pixels are disposed not in a matrix but in a line.

Figure 7:
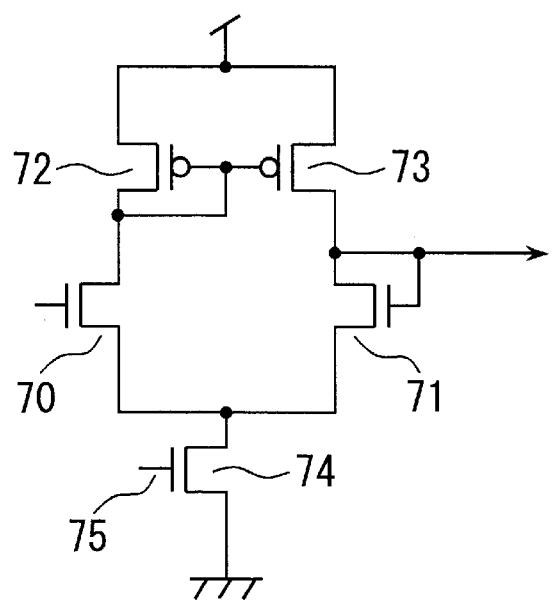
FIG. 7 is a circuit diagram showing an example of a voltage follower used in the solid state imaging device according to the present invention.
Figure 8:
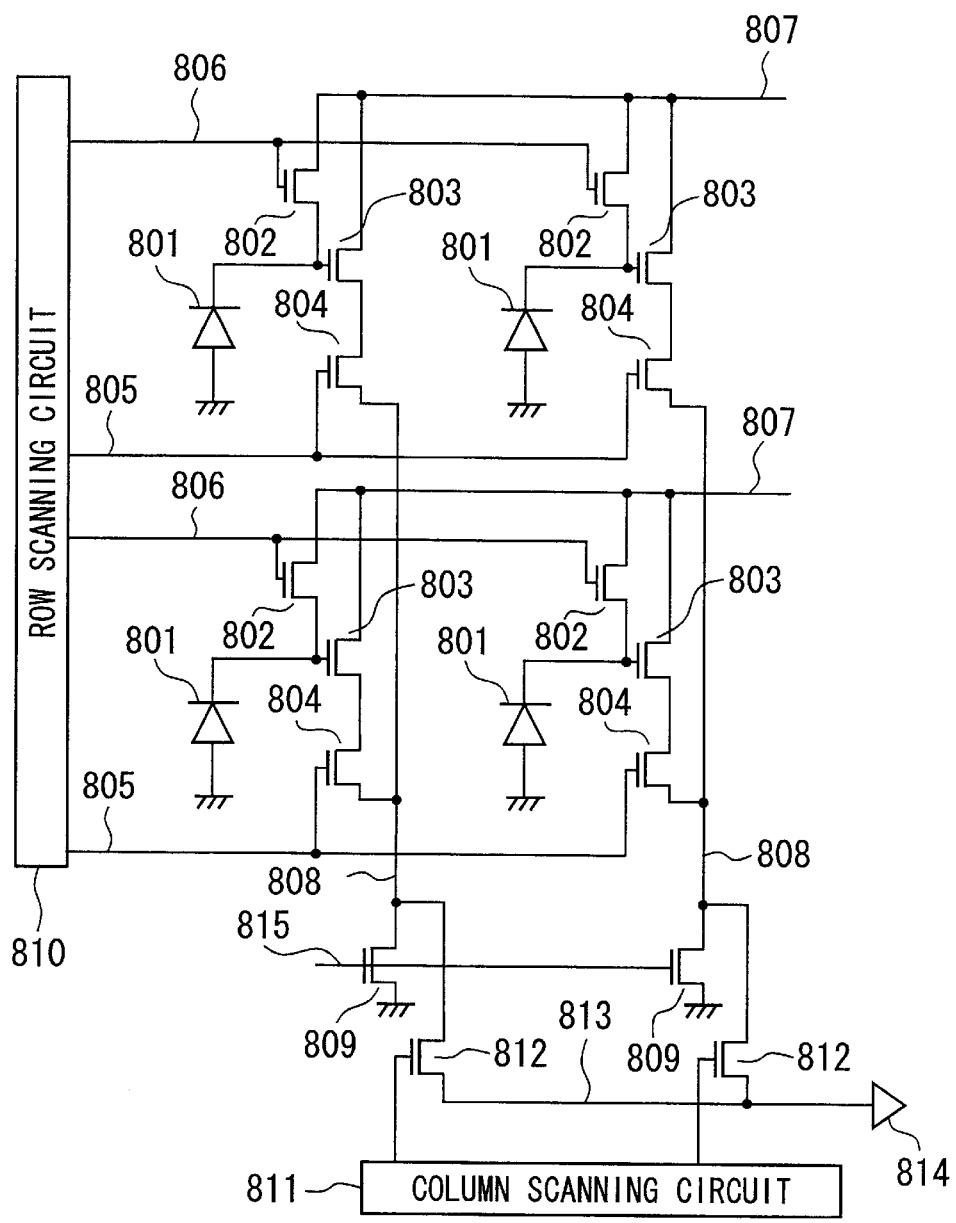
FIG. 8 is a schematic circuit diagram showing a structure of a conventional solid state imaging device comprising active pixels.

The basic principle of operation of the solid state imaging device according to the present invention can be easily understood by considering a principle of operation of a basic voltage follower circuit composed of 5 (five) FET's. Here, as is well known and as shown in FIG. 7, a voltage follower is an amplifier circuit in which a differential amplifier is used with negative feedback to realize a unity gain. In FIG. 7, a voltage follower circuit is shown in which nMOSFET's are used as first and second FET's for amplification 70 and 71, and pMOSFET's are used as first and second active load FET's 72 and 73. By feeding back an output of the differential amplifier to a negative input directly, it is possible to obtain an amplifier circuit having approximately a unity gain.

In the solid state imaging device according to the present invention, basically, the first FET for amplification 70 is composed of each of parallel disposed FET's 103 which are distributed in a pixel matrix. That is, the first FET for amplification 70 which is an input portion of the circuit of FIG. 7 corresponds, for example, to the first FET for amplification 103 within a pixel in FIG. 1. The second FET for amplification 71 corresponds to the second FET for amplification 113 of FIG. 1 which is commonly used for the pixels in each column. The active load FET's 72 and 73 are also commonly used for the pixels in each column, and correspond to the active load FET's 111 and 112 of FIG. 1. In this way, it is possible to obtain a voltage having approximately the same value as the output voltage of the photodiode at the output terminal of the voltage follower. Since the gain of the voltage follower circuit is generally larger than that of a source follower, an output signal having a larger amplitude than that of a conventional solid state imaging device can be obtained by the solid state imaging device according to the present invention.

Thus, in the solid state imaging device according to the present invention, it is possible to obtain a larger output signal amplitude because of the larger gain, when compared with a conventional solid state imaging device of the same type. This is because, since the signal voltage from the photodiode portion is amplified by the amplifier having a unity gain, it is possible to output the signal voltage at the photodiode portion almost without attenuation.

Also, when compared with a conventional solid state imaging device of the same type, the solid state imaging device according to the present invention has a merit that it is more robust against noises. This is because, in the solid state imaging device according to the present invention, an output signal having larger amplitude can be obtained, and thus the strong immunity against external noises is realized.

Further, when compared with a conventional solid state imaging device of the same type, the solid state imaging device according to the present invention has a merit that it can be easily used with a low power supply voltage. The conventional active pixel type solid state imaging device was not suitable for use with a low power supply voltage, because an output signal amplitude thereof is small. On the other hand, the solid state imaging device according to the present invention is suitable for use with a low power supply voltage, because an output signal amplitude thereof is relatively large.

Also, when compared with a conventional solid state imaging device of the same type, the solid state imaging device according to the present invention has a merit that it is possible to couple an AD converter having a relatively low precision to the rear stage of the solid state imaging device. This is because, an output signal amplitude of the solid state imaging device according to the present invention is relatively large when compared with the conventional solid state imaging device, and therefore a high precision is not required in the AD converter. Therefore, it is possible to suppress an increase in the cost of a whole system.

In summary, as mentioned above, in the solid state imaging device according to the present invention, a voltage follower structure is used as an amplifier for amplifying each output of a photodiode. Therefore, it is possible to obtain an active pixel type solid state imaging device having a higher gain, when compared with a conventional solid state imaging device of the same type.

In the foregoing specification, the invention has been described with reference to specific embodiments. However, one of ordinary skill in the art appreciates that various modifications and changes can be made without departing from the scope of the present invention as set forth in the claims below. For example, the solid state imaging device according to the present invention is not limited to those having the structures of the above-mentioned embodiments, but those having structures which are modified and changed in various ways from the above-mentioned structures of the embodiments are also included within the scope of the present invention. Accordingly, the specification and figures are to be regarded in an illustrative sense rather than a restrictive sense, and all such modifications are to be included within the scope of the present invention. Therefore, it is intended that this invention encompasses all of the variations and modifications as fall within the scope of the appended claims.

What is claimed is:

1. A solid state imaging device comprising:
   a plurality of active pixels each of which has at least a photodiode, a reset transistor having one of a source and a drain region directly coupled to an output of said photodiode and a first amplification transistor for amplifying an output of said photodiode and which are disposed in a matrix having rows and columns;
   a plurality of row selecting lines disposed corresponding to rows of said plurality of active pixels respectively;
   a plurality of pairs of column signal lines disposed corresponding to columns of said plurality of active pixels respectively; and
   second amplification transistors which are disposed corresponding to said respective pairs of column signal lines and which amplify outputs of said active pixels delivered via said pairs of column signal lines;
   wherein, in response to a row selecting signal for selecting active pixels of one row, said first amplification transistors of said active pixels of said selected row and said second amplification transistors disposed in corresponding columns are coupled to form voltage followers, and output signals of said active pixels of said selected row are amplified by said voltage followers,
   wherein at least one of a source and a drain of said first amplification transistor is coupled to at least a first column signal line of one of said plurality of pairs of column signal lines via at least one of first and second switching transistors, respectively, and a gate of at least one of said first and second switching transistors is coupled to one of said plurality of row selecting lines.

2. A solid state imaging device as set forth in claim 1, wherein each of said voltage followers includes said first amplification transistor, said second amplification transistor, and a current mirror circuit comprising a pair of transistors constituting a reference side load and an output side load.

3. A solid state imaging device as set forth in claim 2, wherein the gate of said first amplification transistor is coupled to an output of said photodiode, the source of said first amplification transistor is coupled to the source of said second amplification transistor via one of said pair of column signal lines, and the drain of said first amplification transistor is coupled to said reference side load of said current mirror circuit via the other of said pair of column signal lines, and
   wherein the gate of said second amplification transistor is coupled to the drain thereof, and the drain of said second amplification transistor is coupled to said output side load of said current mirror circuit.

4. The solid state imaging device of claim 2, wherein at least one of a source and a drain of said second amplification transistor are coupled to one of said pair of column signal lines via at least one of a third switching transistor and to said output side load of said current mirror circuit via a fourth switching transistor.

5. A solid state imaging device as set forth in claim 1, further comprising column selecting transistors for selectively coupling an output signal of said active pixel of a selected column to an output signal line via said voltage follower.

6. A solid state imaging device as set forth in claim 1, wherein each of said active pixels further comprises said reset transistor disposed for resetting an output voltage of said photodiode before an exposure period.

7. A solid state imaging device comprising:
   a plurality of active pixels each of which has at least a photodiode, a reset transistor having one of a source and a drain region directly coupled to said photodiode for resetting an output voltage of said photodiode, and a first amplification transistor for amplifying an output of said photodiode and which are disposed in a matrix having rows and columns;
   a row scanning circuit for selecting a row of said active pixels disposed in a matrix;
   a column scanning circuit for selecting a column of said active pixels disposed in a matrix;
   a plurality of row selecting lines which are respectively disposed along said rows of said active pixels and which couple from said row scanning circuit to said active pixels of respective rows;
   a plurality of pairs of column signal lines which are respectively disposed along said columns of said active pixels;
   a plurality of reset lines which are respectively disposed along said rows of said active pixels and which couple from said row scanning circuit to said reset transistors in said active pixels of respective rows to provide said reset transistors with a reset signal to start an exposure period of said active pixels;
   second amplification transistors which are disposed corresponding to said respective pairs of column signal lines and which amplify outputs of said active pixels delivered via said pairs of column signal lines;
   wherein, in response to a row selecting signal for selecting active pixels of one row, said first amplification transistors of said active pixels of said selected row and said second amplification transistors disposed in corresponding columns are coupled to form voltage followers, and output signals of said active pixels of said selected row are amplified by said voltage followers,
   wherein at least one of a source and a drain of said first amplification transistor is coupled to at least a first column signal line of one of said plurality of pairs of column signal lines via at least one of first and second switching transistors, respectively, and a gate of at least one of said first and second switching transistors is coupled to one of said plurality of row selecting lines.

8. A solid state imaging device as set forth in claim 7, wherein each of said voltage followers includes said first amplification transistor, said second amplification transistor, and a current mirror circuit comprising a pair of transistors constituting a reference side load and an output side load.

9. A solid state imaging device as set forth in claim 8, wherein the gate of said first amplification transistor is coupled to an output of said photodiode, the source of said first amplification transistor is coupled to the source of said second amplification transistor via one of said pair of column signal lines, and the drain of said first amplification transistor is coupled to said reference side load of said current mirror circuit via the other of said pair of column signal lines, and wherein the gate of said second amplification transistor is coupled to the drain thereof, and the drain of said second amplification transistor is coupled to said output side load of said current mirror circuit.

10. A solid state imaging device comprising:

a plurality of active pixels each of which has at least a photodiode, a reset transistor for resetting an output voltage of said photodiode, and a first amplification transistor for amplifying an output of said photodiode and which are disposed in a matrix having rows and columns;

a row scanning circuit for selecting a row of said active pixels disposed in a matrix;

a column scanning circuit for selecting a column of said active pixels disposed in a matrix;

a plurality of row selecting lines which are respectively disposed along said rows of said active pixels and which couple from said row scanning circuit to said active pixels of respective rows;

a plurality of pairs of column signal lines which are respectively disposed along said columns of said active pixels;

a plurality of reset lines which are respectively disposed along said rows of said active pixels and which couple from said row scanning circuit to said reset transistors in said active pixels of respective rows to provide said reset transistors with a reset signal to start an exposure period of said active pixels;

second amplification transistors which are disposed corresponding to said respective pairs of column signal lines and which amplify outputs of said active pixels delivered via said pairs of column signal lines;

wherein, in response to a row selecting signal for selecting active pixels of one row, said first amplification transistors of said active pixels of said selected row and said second amplification transistors disposed in corresponding columns are coupled to form voltage followers, and output signals of said active pixels of said selected row are amplified by said voltage followers;

wherein each of said voltage followers includes said first amplification transistor, said second amplification transistor, and a current mirror circuit comprising a pair of transistors constituting a reference side load and an output side load;

wherein the gate of said first amplification transistor is coupled to an output of said photodiode, the source of said first amplification transistor is coupled to the source of said second amplification transistor via one of said pair of column signal lines, and the drain of said first amplification transistor is coupled to said reference side load of said current mirror circuit via the other of said pair of column signal lines, and wherein the gate of said second amplification transistor is coupled to the drain thereof, and the drain of said second amplification transistor is coupled to said output side load of said current mirror circuit, wherein at least one of the source and the drain of said first amplification transistor are coupled to said pair of column signal lines via at least one of first and second switching transistors respectively, and the gates of at least one of said first and second switching transistors are coupled to said row selecting line.

11. A solid state imaging device as set forth in claim 10, wherein at least one of the source and the drain of said second amplification transistor are coupled to one of said pair of column signal lines via at least one of a third switching transistor and to said output side load of said current mirror circuit via a fourth switching transistor.

12. The solid state imaging device of claim 8, wherein at least one of a source and a drain of said second amplification transistor are coupled to one of said pair of column signal lines via at least one of a third switching transistor and to said output side load of said current mirror circuit via a fourth switching transistor.

13. A solid state imaging device comprising:

a plurality of active pixels each of which has at least a photodiode and a first amplification transistor for amplifying an output of said photodiode and which are disposed in a matrix having rows and columns;

a plurality of row selecting lines disposed corresponding to rows of said plurality of active pixels respectively;

a plurality of pairs of column signal lines disposed corresponding to columns of said plurality of active pixels respectively; and second amplification transistors which are disposed corresponding to said respective pairs of column signal lines and which amplify outputs of said active pixels delivered via said pairs of column signal lines;

wherein, in response to a row selecting signal for selecting active pixels of one row, said first amplification transistors of said active pixels of said selected row and said second amplification transistors disposed in corresponding columns are coupled to form voltage followers, and output signals of said active pixels of said selected row are amplified by said voltage followers;

wherein each of said voltage followers includes said first amplification transistor, said second amplification transistor, and a current mirror circuit comprising a pair of transistors constituting a reference side load and an output side load;

wherein the gate of said first amplification transistor is coupled to an output of said photodiode, the source of said first amplification transistor is coupled to the source of said second amplification transistor via one of said pair of column signal lines, and the drain of said first amplification transistor is coupled to said reference side load of said current mirror circuit via the other of said pair of column signal lines, and wherein the gate of said second amplification transistor is coupled to the drain thereof, and the drain of said second amplification transistor is coupled to said output side load of said current mirror circuit, wherein the source of said first amplification transistor is coupled to one of said pair of column signal lines via a first switching transistor, and the gate of said first switching transistor is coupled to said row selecting line.

14. A solid state imaging device as set forth in claim 13, wherein the source of said second amplification transistor is coupled to said one of said pair of column signal lines via a third switching transistor.

15. A solid state imaging device comprising:

a plurality of active pixels each of which has at least a photodiode and a first amplification transistor for amplifying an output of said photodiode and which are disposed in a matrix having rows and columns;

a plurality of row selecting lines disposed corresponding to rows of said plurality of active pixels respectively;

a plurality of pairs of column signal lines disposed corresponding to columns of said plurality of active pixels respectively; and second amplification transistors which are disposed corresponding to said respective pairs of column signal lines and which amplify outputs of said active pixels delivered via said pairs of column signal lines;

wherein, in response to a row selecting signal for selecting active pixels of one row, said first amplification transistors of said active pixels of said selected row and said second amplification transistors disposed in corresponding columns are coupled to form voltage followers, and output signals of said active pixels of said selected row are amplified by said voltage followers;

wherein each of said voltage followers includes said first amplification transistor, said second amplification transistor, and a current mirror circuit comprising a pair of transistors constituting a reference side load and an output side load;

wherein the gate of said first amplification transistor is coupled to an output of said photodiode, the source of said first amplification transistor is coupled to the source of said second amplification transistor via one of said pair of column signal lines, and the drain of said first amplification transistor is coupled to said reference side load of said current mirror circuit via the other of said pair of column signal lines, and wherein the gate of said second amplification transistor is coupled to the drain thereof, and the drain of said second amplification transistor is coupled to said output side load of said current mirror circuit, wherein the drain of said first amplification transistor is coupled to the other of said pair of column signal lines via a second switching transistor, and the gate of said second switching transistor is coupled to said row selecting line.

16. A solid state imaging device as set forth in claim 15, wherein the drain of said second amplification transistor is coupled to said output side load of said current mirror circuit via a fourth switching transistor.

17. A solid state imaging device comprising:

a plurality of active pixels each of which has at least a photodiode and a first amplification transistor for amplifying an output of said photodiode and which are disposed in a matrix having rows and columns;

a plurality of row selecting lines disposed corresponding to rows of said plurality of active pixels respectively;

a plurality of pairs of column signal lines disposed corresponding to columns of said plurality of active pixels respectively; and second amplification transistors which are disposed corresponding to said respective pairs of column signal lines and which amplify outputs of said active pixels delivered via said pairs of column signal lines;

wherein, in response to a row selecting signal for selecting active pixels of one row, said first amplification transistors of said active pixels of said selected row and said second amplification transistors disposed in corresponding columns are coupled to form voltage followers, and output signals of said active pixels of said selected row are amplified by said voltage followers;

wherein each of said voltage followers includes said first amplification transistor, said second amplification transistor, and a current mirror circuit comprising a pair of transistors constituting a reference side load and an output side load;

wherein the gate of said first amplification transistor is coupled to an output of said photodiode, the source of said first amplification transistor is coupled to the source of said second amplification transistor via one of said pair of column signal lines, and the drain of said first amplification transistor is coupled to said reference side load of said current mirror circuit via the other of said pair of column signal lines, and wherein the gate of said second amplification transistor is coupled to the drain thereof, and the drain of said second amplification transistor is coupled to said output side load of said current mirror circuit, wherein the source and the drain of said first amplification transistor are coupled to said pair of column signal lines via first and second switching transistors respectively, and the gates of said first and second switching transistors are coupled to said row selecting line.

18. A solid state imaging device as set forth in claim 17, wherein the source and the drain of said second amplification transistor are coupled to said one of said pair of column signal lines via a third switching transistor and to said output side load of said current mirror circuit via a fourth switching transistor.

* * * * *